No. 866,818. PATENTED SEPT. 24, 1907.
A. SCHROEDER, Jr.
MILKING STOOL.
APPLICATION FILED JULY 29, 1907.

Witnesses
M. A. Schmidt
Geo. E. Tew

Inventor
Albert Schroeder Jr
By Milo B. Stevens & Co
Attorneys

UNITED STATES PATENT OFFICE.

ALBERT SCHROEDER, JR., OF CHICAGO, ILLINOIS.

MILKING-STOOL.

No. 866,818.     Specification of Letters Patent.     Patented Sept. 24, 1907.

Application filed July 29, 1907. Serial No. 385,983.

*To all whom it may concern:*

Be it known that I, ALBERT SCHROEDER, Jr., a citizen of the United States, residing at Chicago, in the county of Cook and State of Illinois, have invented certain new and useful Improvements in Milking-Stools, of which the following is a specification.

This invention is a milking stool having means for the support of the pail, said means being adjustable so that pails of various sizes may be used, and also so that the pail may be supported at any desired height.

The invention is illustrated in the accompanying drawings, in which

Figure 1:
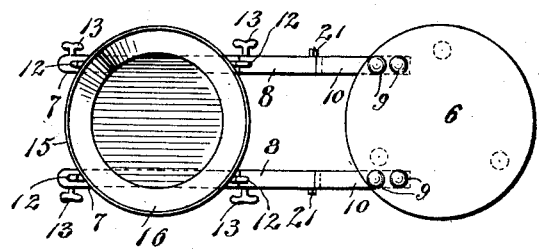
Figure 2:
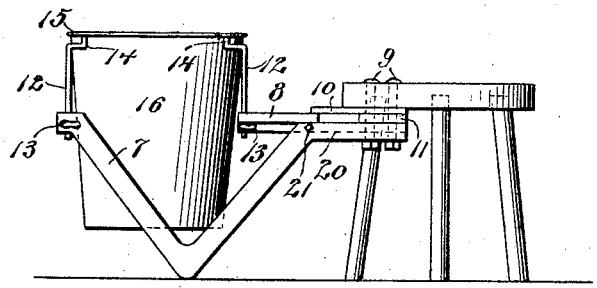
Figure 3:
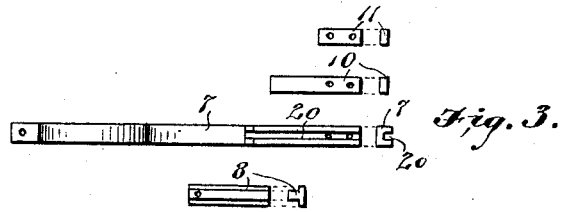

Figure 1 is a top plan view of the article. Fig. 2 is a side elevation. Fig. 3 shows details of some of the parts.

Referring specifically to the drawings, the stool is indicated at 6. The support for the milk pail consists of a pair of outer bent arms 7 and a pair of inner short arms 8. The arms 7 are bent as shown so as to rest on the ground at the elbows, and said arms are connected at their inner ends to the under side of the seat by bolts 9, spacing blocks 10 and 11 being interposed to form recesses in which the short arms 8 may be slid. Said arms 8 fit in grooves indicated at 20 formed in the upper side of the arms 7, and may be slid in or out in said grooves, and fixed by set screws 21. The outer end of each of the arms 7 and 8 is provided with a hole to receive an upright rod or support 12 which is fixed at adjustment by a thumb screw 13. These arms 12 are offset at the top, as indicated at 14, in position to hook under the rim 15 of the pail 16. By turning the standards 12 in the holes in the ends of the arms the offset parts 14 may be swung into close or proper position under the rim of the pail, so as to hold the pail tightly, even in case of slight variation in size of different pails. Also the standards 12 may be raised or lowered, and so adjusted to the desired height.

Inasmuch as the elbows of the long arms 7 rest upon the ground under the pail, there is no danger of the stool and pail tipping over should the milker rise from his seat.

Slight variation in the size of the pails may be accommodated by turning the standards 12. Greater variations may be accommodated by sliding the arms 8 in or out, as may be necessary. The piece 10 overlies the arm 8, so that said arm is held in place in the groove 20.

I claim:

1. A milking stool provided with a pail holder, comprising arms projecting from the stool, and standards mounted on the outer ends of the arms and arranged to receive and support a pail therebetween.

2. A milking stool provided with a pail holder comprising a pair of outer arms and a pair of inner arms projecting from the stool, and having means at their outer ends to receive and hold a pail therebetween, one pair of said arms being adjustable, for various sizes of pails.

3. A milking stool provided with projecting arms adapted to hold a pail therebetween, said arms being bent down in the form of elbows which rest on the ground.

4. A milking stool provided with a pail holder comprising arms projecting from the stool, vertically adjustable standards mounted on the outer ends of the arms and arranged to turn therein and having offset portions at the top adapted to engage under the rim of a pail.

In testimony whereof I affix my signature, in presence of two witnesses.

ALBERT SCHROEDER, JR.

Witnesses:
    H. G. BATCHELOR,
    HENRY BENNING.